United States Patent [19]
Lu et al.

[11] Patent Number: 5,570,216
[45] Date of Patent: Oct. 29, 1996

[54] BISTABLE CHOLESTERIC LIQUID CRYSTAL DISPLAYS WITH VERY HIGH CONTRAST AND EXCELLENT MECHANICAL STABILITY

[75] Inventors: Minhua Lu, Kent; Haiji Yuan, Stow, both of Ohio

[73] Assignee: Kent Display Systems, Inc., Kent, Ohio

[21] Appl. No.: 421,772

[22] Filed: Apr. 14, 1995

[51] Int. Cl.$^6$ .............................. G02F 1/137; G02F 1/139
[52] U.S. Cl. .............................. 359/101; 359/52; 359/62; 359/77
[58] Field of Search .................. 428/1; 359/99, 359/101, 103, 105, 91, 38, 65, 52, 62, 77

[56] References Cited

U.S. PATENT DOCUMENTS

| | | |
|---|---|---|
| 3,976,362 | 8/1976 | Kawakami . |
| 4,032,218 | 6/1977 | Scheffer . |
| 4,068,925 | 1/1978 | Tani et al. . |
| 4,731,610 | 3/1988 | Baron et al. . |
| 5,251,048 | 10/1993 | Doane et al. . |
| 5,252,954 | 10/1993 | Nagata et al. . |
| 5,422,033 | 6/1995 | Mochizuki et al. ............ 359/91 |
| 5,427,828 | 6/1995 | Park ............................... 359/78 |
| 5,437,811 | 8/1995 | Doane et al. ................... 359/91 |
| 5,453,863 | 9/1995 | West et al. ..................... 359/91 |
| 5,493,430 | 2/1996 | Lu et al. ........................ 359/105 |

FOREIGN PATENT DOCUMENTS

| | | |
|---|---|---|
| 0569809 | 11/1993 | European Pat. Off. . |
| 2826440 | 8/1979 | Germany . |
| 55-73023 | 6/1980 | Japan . |
| 57-115522 | 7/1982 | Japan . |
| 1182830 | 6/1989 | Japan . |

*Primary Examiner*—William L. Sikes
*Assistant Examiner*—Kenneth Parker
*Attorney, Agent, or Firm*—Harness, Dickey & Pierce P.L.C.

[57] ABSTRACT

A structurally stabilized bistable cholesteric display. The display has a back plate and a front plate with a liquid crystal material disposed therebetween. The liquid crystal material is homeotropically aligned at least at the substrate and is held in alignment by a securement matrix forming agent. The material is thermally annealed to align the helix axis of the liquid crystal molecules parallel to the substrates and a polymer may be used to secure the molecules in this position.

21 Claims, 1 Drawing Sheet

BISTABLE CHOLESTERIC LIQUID CRYSTAL DISPLAYS WITH VERY HIGH CONTRAST AND EXCELLENT MECHANICAL STABILITY

TECHNICAL FIELD

This application relates to polymer stabilized bistable cholesteric liquid crystal displays. More specifically, the present invention relates to methods of using a thermal annealing process to provide displays with very high contrast and excellent mechanical stability.

BACKGROUND OF THE INVENTION

The reflective cholesteric texture displays have two stable optical states at zero field. One is the planar texture which reflects light at a preselected wavelength determined by the pitch of the cholesteric liquid crystal. The other is the focal conic texture which is weak, scattering or nearly optically transparent.

There are two ways to achieve bistabilty in the cholesteric displays: one is polymer network and the other is the surface condition. The polymer stabilized cholesteric texture (PSCT) displays are made from panels with homogeneous surface treatment, filled with the cholesteric liquid crystal mixture with small amounts of monomer and photoinitiator, and cured by ultraviolet irradiation in the presence of an electric field which aligns the molecules perpendicular to the substrate. The surface stabilized or polymer free cholesteric displays are made without homogenous surface treatment and polymer gel. PSCT liquid crystal displays are fully described in U.S. Pat. Nos. 5,251,048 and patent application Ser. Nos. 07/694,840 and 07/969,093.

The polymer free displays require much simplified manufacturing processes, but have not yet been used in production because of the difficulties in controlling the inactive areas. The inactive areas would be in bright reflecting state due to the flow orientation, which is very irritating for medium to high resolution displays. It degrades the black state and hence reduces the contrast. We can make the inactive areas black by thermal annealing in the polymer free displays. However, the texture is very sensitive to mechanical shocks. The inactive areas change into bright reflective state after being squeezed. As a result, the background color of the display is non-uniform. The reflectivity of the inactive area of the PSCT is relatively insensitive to mechanical shocks since the molecules are in the planar state. However, the bright color in the active area makes the dark portion of a displayed image less dark and hence reduces the image contrast for medium to high resolution displays.

The problems described above can be overcome by the application of black mask inside the cell in principle. However, black mask is thick (greater than 1 μm) and difficult to make for high resolution displays. It also adds manufacturing cost and introduces potential contaminants into the cells. In addition, the non-smooth surface caused by black mask may generate extra chromatographic problems during filling.

SUMMARY OF THE INVENTION

In accordance with the present invention there is provided a structurally stabilized bistable cholesteric display. The display of the present invention includes a first back plate substrate and a second front plate substrate. A liquid crystal material is disposed between the first and second substrates. The liquid crystal material is homeotropically aligned at least at the substrate and is held in this alignment by a securement matrix forming agent. In a preferred embodiment the display is thermally annealed to align the helix axis of the liquid crystal molecules parallel to the substrates and a cured polymer is used to secure the molecules in this position.

Displays produced in accordance with the present invention provide an excellent transparent focal conic state. This leads to a very high contrast display. The displays of the present invention have excellent mechanical stability. The displays of the present invention do not require an electric field for alignment during the polymerization. Therefore, large volume low cost production is possible.

Additionally, the helical polymer network, unlike regular PSCT displays, will not create any extra defect center in the focal conic state. This provides a clear, transparent focal conic state and offers excellent contrast.

Further features and advantages of the present invention will be realized by those skilled in the art upon review of the Brief Description of the Drawings, Detailed Description of the Preferred Embodiments and Claims set forth below.

DETAILED DESCRIPTION OF THE PREFERRED EMBODIMENT

Figure 1:
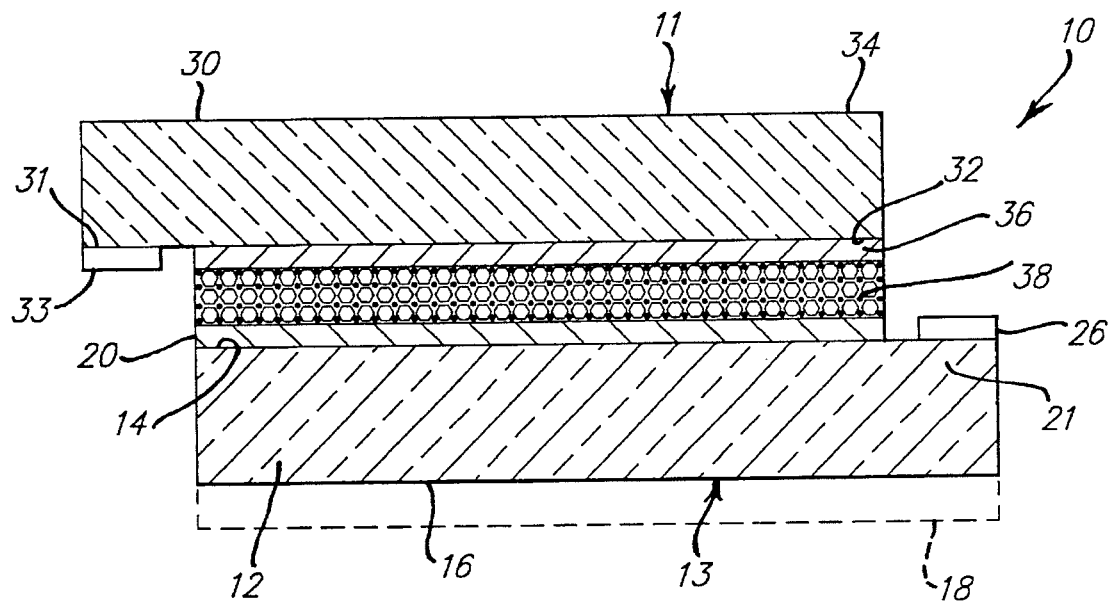
FIG. 1 is a cross-sectional side view of a PSCT display device.

While the specification concludes with claims defining the features of the invention that are regarded as novel, it is believed that the invention will be better understood from a consideration of the following description in conjunction with the figures, in which like reference numerals are carried forward.

As some background, and referring now to FIG. 1, there is illustrated therein a cross-sectional side view of a PSCT or PFCT display device. The display device 10 includes a viewer proximal 11, and viewer distal 13 side. The display 10 further includes a first display substrate 12 fabricated of an insulating material such as glass, plastic, ceramic, silicon wafer, polymeric material or composites, examples of which include Donnelly Applied Films' ITO coated sodalime glass substrates, Corning's silicate glass substrate, Southwall Technologies ITO coated plastic substrates and combinations thereof. In a preferred embodiment the substrate 12 is a transparent material having a coating thereon to provide homeotropic alignment of molecules. In using one of these types of display substrates, the driving electronics and logic circuitry must be connected to the substrate, or in the case of quartz, drivers on the film may be grown on the substrate.

Alternatively, and in a preferred embodiment, the first substrate 12 is fabricated of silicon. Thus, the driving electronic and logic circuitry, as are conventionally known in the industry, may be fabricated directly on the silicon substrate, as is known to those skilled in the art.

The substrate 12 has first and second major surfaces 14 and 16. The second major surface 16 defines the viewer distal 13 side of the device. On either surface 14 or 16 of substrate 12 there may be disposed a layer of coloring or paint 18 (and illustrated in phantom on surface 16) adapted to impart color to light incident thereon. As noted hereinabove, a surface 14 (for example) of the substrate 12 has heretofore been painted black to maximize absorption of light incident thereon. The surface 14 (or 16) may be painted or colored one or more non-black colors so as to maximize reflection of light thereon. Patterns of color or color stripes and columns may also be employed to impart color to the display.

Disposed atop the surface 14 of substrate 12 is an electrode layer 20. The electrode layer 20 should be a transparent electrode material so that light incident on the display will pass through the electrode layer 20. Accordingly, the electrode layer 20 is typically a thin layer of metal such as silver, copper, titanium, molybdenum, and combinations thereof. Alternatively, the electrode layer may be a thin layer of a transparent conductive material such as indium tin oxide.

Disposed on a peripheral region 21 of substrate 12 is the electronics necessary for driving the LCD. The electronics 26 take the form of liquid crystal driver chips and/or logic chips, as are conventionally known in the art. Such chips may be attached via chip on board, chip-on-glass approach, TAB, or as poly-silicon on glass (quartz).

Disposed opposite the first substrate 12 is a second substrate 30 fabricated of a high quality, transparent material such as glass or plastic. The substrate 30 has first and second major surfaces 32, and 34 respectively. Disposed on the first major surface 32 is a transparent layer of conductive material 36, fabricated of materials such as those described hereinabove. In a preferred embodiment both substrate 12 and substrate 30 may further have a layer of alignment material disposed thereon (not shown). The purpose of these layers is to enhance the performance of the liquid crystal materials disposed therebetween, as described in greater detail hereinbelow.

Disposed on a peripheral region 31 of substrate 30 is the electronics necessary for driving the LCD. The electronics 33 take the form of liquid crystal driver chips and/or logic chips, as are conventionally known in the art. Such chips may be attached via chip on board, chip-on-glass approach, TAB, or as poly-silicon on glass (quartz).

The substrates 12 and 30 are arranged in opposed, facing relationship so that said layers of the conductive material are parallel and facing one another. As noted above, the opposing surfaces of the layers 20 and 36 on top of the substrates 12 and 30 are prepared to provide homeotropic alignment. This may be accomplished by spin coating, dipping, and offset printing with a homeotropic alignment agent known in the art. The alignment material can be side chain polyimide, silane, lipid or the like. A particularly preferred material is a Nisson Chemical SE-7511 L polyimide coating material.

The liquid crystal material is then placed between the substrates 12 and 30 as is known to those skilled in the art. The liquid crystal material is a mixture of cholesteric liquid crystal with proper pitch, and a securement matrix forming agent. Generally, the cholesteric liquid crystal is a nematic liquid crystal having positive dielectric anisotropy and chiral dopants. The pitch of the liquid crystal molecules of the present invention is in a range of from about 0.01 to about 10 microns. The securement matrix forming agent may be any material which has the ability to secure the liquid crystal molecules in an orientation in the display. Thus, any material which is light transmitting, soluble in liquid crystals, and curable or hardenable to a stable state for securement of the molecules will be useful in the present invention. Thus, suitable securement matrix forming agents include photopolymerizable monomer systems, thermoplastic polymers, thermosettable polymers or other cross-linking materials. In a preferred embodiment, a cross-linkable monomer and photoinitiator is intermixed with liquid crystal. A preferred monomer system is a biacrylate with alpha cleavage photointiators. However, other suitable agents include polymethacrylates, biacrylates, hydroxy functional polymethacrylates and epoxies.

Thus, in the process aspects of the present invention the assembled display with the uncured liquid crystal mixture is first annealed at a temperature of generally from about 40° C. to about 180° C. and typically from about 80° C. to about 130° C. and preferably from about 90° C. to about 110° C. The assembled display is heated for an effective period of time to turn the LCD material into the isotropic phase. The material was then allowed to uniformly cool down to ambient temperature to align the helix axis to a position parallel with the substrates. The purpose of this thermal annealing step is to force the liquid crystal material into the isotropic phase to eliminate the flow orientation due to the filling process and to align the helix axis of the liquid crystal molecules from perpendicular to parallel to the substrate as the display is cooling into the cholesteric phase. This places the display in a transparent state. Typically, the display is heated for a time of from about 10 sec. to about 1 hour. However the time may vary depending on the type of the display involved, the liquid crystal material and the oven temperature used. The display is allowed to cool to ambient room temperature prior to the next step of ultraviolet curing.

Thereafter, the thermally annealed display is subjected to UV radiation for cross-linking of the monomers dispersed in the liquid crystal material into a polymer network. Because the small amount of the monomers and the photoinitiators are dispersed in the liquid crystal material, the monomers will follow the orientation of the surrounding liquid crystal molecules. The liquid crystal molecules are aligned with the helical axis parallel to the substrates after thermal annealing, and with the monomers likewise aligned. Since there is no electric field applied on to the display during the UV curing, the polymer network formed would follow the helical structure of the liquid crystal molecules. This helical polymer network will in turn anchor the liquid crystal molecules into this configuration even when distortion caused by squeezing of the display or other mechanical shocks occurs. The contrast in such displays is very high since the helical polymer network anchors both the active and the inactive areas into a clear transparent focal conic state. Thus upon activation to the reflective state at select locations, the inactive areas are already held in the transparent state providing superior contrast.

As will be readily appreciated the monomer concentration has to be optimized for the best contrast and mechanical stability of the display. Generally in the present invention monomers are used in amount of from about greater than 0 to about 25% by weight of the total liquid crystal mixture. Typically monomers are used in the range of from about greater than 0 to about 2% and preferably from about 0.1 to about 1% by weight.

Thus, an electric field may be applied to layer of the cholesteric liquid crystal material disposed therebetween. Once such a field is applied, the material is set to one of the two said stable states, where it will remain until a new field is applied.

The PSCT and PFCT liquid crystal materials are fully described in, for example, U.S. Pat. No. 5,251,048 and patent application Ser. Nos. 07/694,093 and 07/969,093, the disclosures of which are incorporated herein by reference.

Reflective cholesteric texture liquid crystal displays (both PSCT and PFCT) have two stable states at a zero applied field. One such state is the planar texture state which reflects light at a preselected wavelength determined by the pitch of the cholesteric liquid crystal material itself. The other state is the focal conic texture state which is substantially optically transparent. By stable, it is meant that once set to one state or the other, the material will remain in that state, without the further application of an electric field. Conversely, other types of conventional displays, each liquid crystal picture element must be addressed many times each second in order to maintain the information stored thereon. Accordingly, PSCT and PFCT materials are high desirable for low energy consumption applications, since once set they remain so set.

Figure 2:
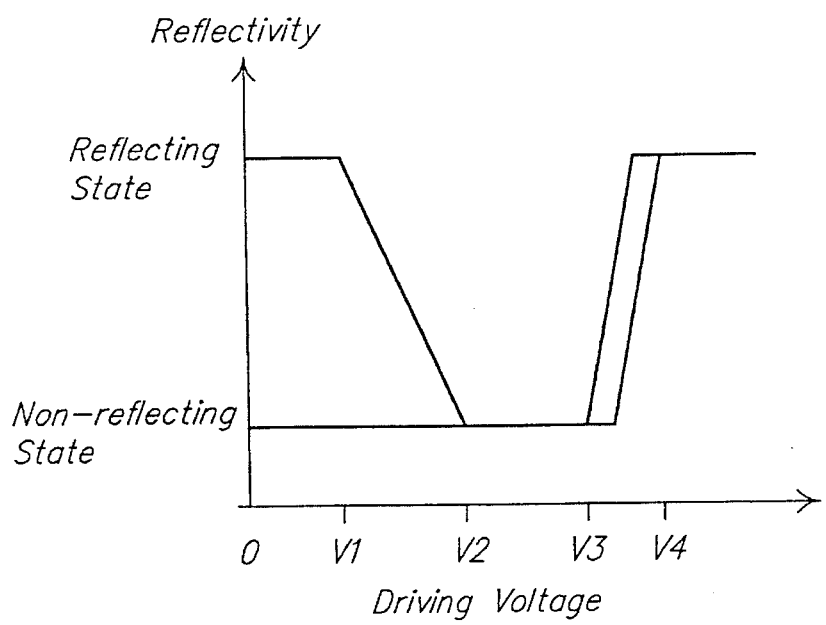
FIG. 2 is a table showing the state of the liquid crystal material after the application of various driving voltages thereto.

Referring now to FIG. 2, there is illustrated a table showing the state of the liquid crystal material after the application of various driving voltages thereto. The liquid crystal material begins in a first state, either the reflecting state or the non-reflecting state, and is driven with an AC voltage, having an rms amplitude above $V_4$. When the voltage is removed quickly, the liquid crystal material switches to the reflecting state and will remain reflecting. If driven with an AC voltage between $V_2$ and $V_3$ the material will switch into the non-reflecting state and remains so until the application of a second driving voltage. If no voltage is applied, or the voltage is well below $V_1$, then the material will not change state, regardless of the initial state.

Depending on the type of display desired a plurality of the displays 10 can be stacked on top of one another if desired for instance to provided a multicolored display. Thus, displays in accordance with the present invention are easily used in multilayer configurations.

Displays in accordance with the present invention have excellent transparent focal conic state which means a very high contrast display. Additionally these displays have excellent mechanical stability which is extremely important for displays made with flexible plastic substrates.

The inactive area of the displays made in accordance with the present invention are locked into transparent state, hence shows the background color. Therefore, no black or color mask is required to improve the contrast of the display, which can be very expensive and difficult. Another simplification in the manufacturing process with the present invention is that no electric field is required for aligning the molecules during the polymerization. Since the application of the electric field to every display during curing would greatly affected the volume production, the elimination of the alignment electric field in the present invention will increase the throughput and reduce the manufacturing cost.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A structurally stabilized bistable cholesteric display comprising:

a first back plate substrate and a second front plate substrate, a cholesteric liquid crystal material disposed between said substrates, said liquid crystal material being homeotropically aligned at the substrate surfaces and secured in an alignment by a securement matrix forming agent.

2. The display of claim 1 wherein non-reflective inactive areas are provided by use of a thermal annealing process and a polymer network for locking the liquid crystals in a non-reflecting state which remains non-reflecting in an inactive area of the display.

3. The display of claim 2 wherein the temperature of heating if from about 40° C. to about 180° C.

4. The display of claim 1, wherein the liquid crystal material is subjected to a thermal annealing process, which includes heating the display into isotropic phase and then cooling down to cholesteric phase.

5. The display of claim 3 wherein the monomer concentration prior to polymerization is from about 0% to about 10%.

6. The display of claim 3 wherein the monomer concentration prior to polymerization is from about 0.1% to 1%.

7. The display of claim 1 wherein said securement matrix forming agent is selected from the group consisting of photopolymenzeable monomer systems, thermoplastic, thermosets and mixtures thereof.

8. The display of claim 1 wherein said securement matrix forming agent is selected from the group consisting of polymethacrylates, biacrylates, hydroxy functional polymethacrylates, epoxies and mixtures thereof.

9. The display of claim 1 wherein an electric field is used to align the molecules of the liquid crystal material.

10. The display of claim 1 wherein the polymer is cured in the absence of an electric field to align the liquid crystal material molecules.

11. The display of claim 1 wherein at least a second display is stacked on said display to produce a multilayer display.

12. The display of claim 1 wherein said back plate substrate is selected from the group consisting of glass, plastic, ceramic, silicon wafer, other polymeric material, and composite materials.

13. The display of claim 1 wherein the front plate substrate is a transparent material.

14. A method of manufacture of a bistable cholesteric liquid crystal display comprising;

a) Providing a liquid crystal display including a first and a second substrate with a liquid crystal material mixture contained therebetween; the liquid crystal mixture including liquid crystal molecules intermixed with an agent for forming a securement matrix for the liquid crystal molecules; the first and second substrates being operable for changing the liquid crystal molecules between a non-reflecting state and a reflecting state.

b) Thermal annealing the display by heating the display into isotropic phase and then cooling down to cholesteric phase to align the liquid crystal molecules with a helix axis parallel to the substrate;

c) securing liquid crystal molecules in said liquid crystal mixture with said agent for securing the liquid crystal molecules in said non-reflecting state in inactive portions of the display.

15. The method of claim 14 wherein the first and second substrates are treated such that the liquid crystal molecules are homeotropically aligned at least at the interface between the substrates and the liquid crystal molecules for aligning the molecules perpendicular to the substrates at least at an interface thereof.

16. The method of claim 15 wherein the heating step is accomplished at a temperature of from about 80° C. to about 130° C.

17. The method of claim 15 wherein the heating step is accomplished at a temperature of from about 90° C. to about 110° C.

18. The method of claim 14 wherein said agent is selected from the group consisting of potopolymerizeable monomer systems, thermoplastic polymers, thermoset polymers, and mixtures thereof.

19. The method of claim 14 wherein the heating step is accomplished at a temperature of from about 40° C. to about 180° C.

20. The method of claim 14 wherein the polymerization is accomplished by subjecting the material to ultraviolet radiation.

21. The method of claim 14 wherein the agent is selected from the group consisting of polymethacrylates, biacrylates, hydroxy functional polymethacrylates, epoxies and mixtures thereof.

* * * * *

UNITED STATES PATENT AND TRADEMARK OFFICE
CERTIFICATE OF CORRECTION

PATENT NO. : 5,570,216
DATED : October 29, 1996
INVENTOR(S) : Minhua Lu, et al.

It is certified that error appears in the above-indentified patent and that said Letters Patent is hereby corrected as shown below:

Front Page, [56] References Cited, insert --OTHER DOCUMENTS
Doane, et al., Front-lit Flat Panel Display from Polymer Stabilized Cholesteric Textures, JAPAN DISPLAY '92, pages 73-76--.

Column 1, Line 22, "bistabilty" should be --bistability--.

Column 1, Line 33, "Nos." should be --No.--.

Column 3, Line 21, "chip on board" should be --chip-on-board--.

Column 3, Line 39, "chip on board" should be --chip-on-board--.

Column 4, Line 59, after "to" insert --the--.

Column 5, Line 13, "high" should be --highly--.

Column 5, Line 48, "affected" should be --affect--.

Column 6, Line 7, Claim 3, "if" should be --is--.

Column 6, Line 38, Claim 14, "comprising;" should be --comprising:--.

Column 6, Line 39, Claim 14, "Providing" should be --providing--.

Column 6, Line 46, Claim 14, "state." should be --state;--.

UNITED STATES PATENT AND TRADEMARK OFFICE
CERTIFICATE OF CORRECTION

PATENT NO. : 5,570,216
DATED : October 29, 1996
INVENTOR(S) : Minhua Lu, et al.

It is certified that error appears in the above-indentified patent and that said Letters Patent is hereby corrected as shown below:

Column 6, Line 47, Claim 14, "Thermal" should be --thermal--.

Column 7, Line 2, Claim 18, "potopolymerizeable" should be --photopolymerizeable--.

Signed and Sealed this

Fifteenth Day of April, 1997

Attest:

BRUCE LEHMAN

Attesting Officer

Commissioner of Patents and Trademarks